United States Patent [19]

Nakayama et al.

[11] Patent Number: 5,231,613

[45] Date of Patent: Jul. 27, 1993

[54] MAGNETO-OPTICAL RECORDING DEVICE

[75] Inventors: Junichiro Nakayama, Shiki; Tomoyuki Miyake; Hiroyuki Katayama, both of Nara; Kenji Ohta, Kitakatsuragi, all of Japan

[73] Assignee: Sharp Kabushiki Kaisha, Osaka, Japan

[21] Appl. No.: 640,109

[22] Filed: Jan. 11, 1991

[30] Foreign Application Priority Data

| Jan. 19, 1990 | [JP] | Japan | 2-11572 |
| Jul. 18, 1990 | [JP] | Japan | 2-191063 |
| Aug. 2, 1990 | [JP] | Japan | 2-206319 |

[51] Int. Cl.$^5$ .............................................. G11B 13/04
[52] U.S. Cl. ................................ 369/13; 360/103; 360/119
[58] Field of Search ............... 369/13; 360/103, 102, 360/114; 428/900, 694

[56] References Cited

U.S. PATENT DOCUMENTS

4,188,434  2/1980  Loran ..................... 360/135

FOREIGN PATENT DOCUMENTS

| 441611A1 | 8/1991 | European Pat. Off. | 360/103 |
| 57-183623 | 11/1982 | Japan | 360/103 |
| 63-292473 | 11/1988 | Japan | 360/103 |
| 1-171101 | 7/1989 | Japan | 360/103 |
| 2-203418 | 8/1990 | Japan | 360/103 |
| 3-254452 | 11/1991 | Japan | 360/103 |

OTHER PUBLICATIONS

Patent Abstracts of Japan vol. 12, No. 280 (P-739) Aug. 2, 1988, & JP-A-63 058605 (Sony Corp) Mar. 14, 1988.
Patent Abstracts of Japan—vol. 7, No. 270 (P-240) Dec. 2, 1983, & JP-A-58 150122 (Nippon Denki KK) Sep. 6, 1983.
Patent Abstracts of Japan—vol. 9, No. 105 (P-354) May 9, 1985, & JP-A-59 227065 (Fujitsu KK) Dec. 20, 1984.
Patent Abstracts of Japan—vol. 7, No. 212 (P-224) Sep. 20, 1983, & JP-A-58 105421 (Suwa Seikosha KK) Jun. 23, 1983.
Patent Abstracts of Japan vol. 13, No. 17 (P-823) Jan. 17, 1989, & JP-A-63 220422 (Shin Etsu Chem Co Ltd) Sep. 13 1988.
Patent Abstracts of Japan—vol. 10, No. 48 (P-431) Feb. 25, 1986, & JP-A-60 193181 (Fujitsu KK) Oct. 1, 1985.
Patent Abstracts of Japan—vol. 11, No. 293 (P-619) Sep. 22, 1987, & JP-A-62 088131 (Hitachi Ltd) Apr. 22, 1987.
Patent Abstracts of Japan—vol. 13, No. 443 (P-941) Oct. 5, 1989, & JP-A-01 171101 (Fujitsu Ltd) Jul. 6, 1989.

(List continued on next page.)

*Primary Examiner*—Robert J. Pascal
*Assistant Examiner*—Tan Dinh
*Attorney, Agent, or Firm*—Nixon & Vanderhye

[57] ABSTRACT

A magneto-optical recording device has a flying head that floats over a magneto-optical disk according to the rotation of the magneto-optical disk. The flying head includes a head slider. A solid lubricant is applied to the bottom surface of the head slider facing the magneto-optical disk. Since the solid lubricant makes the flying head contact with the magneto-optical disk smoothly, the scratching and wear of the magneto-optical disk and the flying head decrease. Therefore, the reliability and the durability of the magneto-optical recording device can improve. Physical protrusions and recessions or holes containing fluorocarbon oil therein may be formed instead of the solid lubricant. In this case, the contact area between the flying head and the magneto-optical disk is also smaller than the case where physical protrusions and recessions are not formed. In addition, with a configuration such that thin-film layers made of a fluorocarbon resin having an excellent lubricity are formed on both sides of the bottom surface of the head slider, since the magneto-optical disk comes into contact with the head smoothly, the reliability and the durability of the magneto-optical recording device can improve.

4 Claims, 8 Drawing Sheets

OTHER PUBLICATIONS

Patent Abstracts of Japan—vol. 13, No. 96 (P-839) Mar. 7, 1989, & JP-A-63 276769 (Fujitsu Ltd) Nov. 15, 1988.

Patent Abstracts of Japan—vol. 13, No. 482 (P-953) Nov. 2, 1989, & JP-A-01 192014 (Hitachi Ltd) Aug. 2, 1989.

Patent Abstracts of Japan—vol. 13, No. 590 (P-984) Dec. 26 1989, & JP-A-01 251308 (Hitachi Metals Ltd) Oct. 6, 1989.

Patent Abstracts of Japan—vol. 13, No. 64 (P-827) Feb. 14, 1989, & JP-A-63 251981 (Fujitsu Ltd) Oct. 19 1988.

Patent Abstracts of Japan—vol. 13, No. 256 (P-884) Jun. 14, 1989, & JP-A-01 053307 (Nikkon Corp) Mar. 1, 1989.

Patent Abstracts of Japan—vol. 11, No. 230 (P-599) Jul. 28, 1987, & JP-A-62 043823 (NEC Corp) Feb. 25, 1987.

MAGNETO-OPTICAL RECORDING DEVICE

FIELD OF THE INVENTION

The present invention relates to a magneto-optical recording device through which information is recorded optically, more precisely to a flying head for magneto-optical recording.

BACKGROUND OF THE INVENTION

In recent years, the research and development of magneto-optical recording media as high density and large capacity memories has been much carried out. In magneto-optical recording with magneto-optical recording media, a substrate that is made of glass, plastic, ceramic materials, etc. and is coated with a vertical magnetization film composed of metal-magnetic substance, is used as a recording medium, and information is recorded on the recording medium by switching the magnetization direction of a desired portion on the vertical magnetization film.

More concretely, when recording information, first, a recording medium is initialized by applying the external magnetic field from an external magnetic field generation device to the recording medium. With this operation, the magnetization direction of the vertical magnetization film on the recording medium is made uniform either upward or downward.

When the initialization is completed, a laser beam from light emitting means is irradiated on a desired recording portion of the recording medium. A temperature of the recording portion whereon the laser beam is irradiated rises, and when the temperature reaches or exceeds around the Curie point of the vertical magnetic film or its magnetic compensation point, the coercive force on the recording portion becomes zero or substantially zero. With this state, the magnetization direction is switched by applying an external magnetic field (bias magnetic field) whose magnetization direction is opposite to the set direction of the above-mentioned recording portion when initialized. The temperature of the recording portion decreases and eventually returns to the room temperature by stopping the irradiation of the laser beam on the recording portion. As described above, since the switched magnetization direction of the recording portion is kept, desired information can be recorded.

When reproducing information recorded in the above-mentioned way, a linearly polarized laser beam whose power is weaker than the one used during recording is irradiated on a recorded portion, and reflected light or transmitted light from the irradiated recording portion is detected. The recorded information is reproduced by detecting the rotation angle of the polarization plane of the reflected light or transmitted light. More precisely, since the rotation angle of polarization plane varies depending on the magnetization direction of the recorded portion (magnetic Kerr effect of magnetic Faraday effect), information can be read out optically with the use of the magnetic effect.

Therefore, magneto-optical recording as rewritable large capacity memory element has been focused recently. For rewriting information recorded on a recording medium, the following requirements must be fulfilled.

(1) Initializing the recording medium.
(2) Improving an external magnetic field (bias magnetic field) generation device or a recording medium whereon information can be rewritten without performing erasing operation.

To meet requirement (1), however, an initialization device is separately demanded and two magneto-optical write heads may be needed, thereby causing the number of parts to increase. That is to say, in case of erasing information with a single magneto-optical write head, the same time taken for recording is required for erasing. In the mean time, in order to meet requirement (2), the composition and the thickness of the magnetic film need to be controlled.

For the above reasons, the most effective means is the improvement of an external magnetic field (bias magnetic field) generation device satisfying requirement (2). Namely, information is recorded by, for example, maintaining the output of a laser beam at a fixed level and switching an external magnetic field at high speed. To switch the external magnetic field at high speed, a coil and a coil core for generating external magnetic field must be miniaturized to a great degree, and therefore, magnetic field generation areas become smaller. As a result, a magneto-optical write head and a recording medium must come close each other.

In order to get close the magneto-optical write head and the recording medium each other, a flying head in the shape of slider shown in FIG. 8 has been known and adopted. The flying head comprises a head slider means 31 and a head coil means 32. As shown in FIG. 8, the head coil means 32 is formed at an edge of the head slider means 31. The bottom surface of the head coil means 32 is aligned with the bottom surface of the head slider means 31. The head coil means 32 is connected to a power source 37 that generates a magnetic field, and the direction of the generated magnetic field varies depending on the polarity of the power source 37.

The head having the above configuration comes into contact with a recording medium at the time the recording medium starts rotating and stops rotating. Therefore, similar to computer hard disk cases where lubricating oil such as fluorocarbon oil is applied to the disk surface, lubricating oil 33 may be applied to a protective resin film 34 (see FIG. 8). With this application, the wear rate of the flying head and the magneto-optical recording medium can be reduced. Regarding the formation of the protective resin film 34, the protective resin film 34 is first applied to a vertical magnetization film 35 through the spin coating or other process and then hardened by an irradiation of ultraviolet light. The vertical magnetization film 35 is formed on a transparent substrate 36.

The magneto-optical medium, however, is portable, and this point differs from the above-mentioned hard disk. Therefore, in case liquid lubricating oil is applied to the surface of the magneto-optical recording medium, it is difficult to keep the oil staying on the surface, and therefore scratches may occur on the surface due to the absence of the liquid lubricating oil. This causes the reliability of the magneto-optical recording medium to remarkably lower.

Additionally, some manufacturers produce magneto-optical recording media without lubricating oil on their surface. In such a case, a problem arises, the magneto-optical recording media without lubricating oil are not compatible with magneto-optical recording media produced by other manufactures.

In the mean time, solid lubricating oil may be applied to a portion (the bottom surface of a head) of a flying head which comes into contact with the surface of a magneto-optical recording medium. In this however solid lubricating oil to be applied to the flying head needs to have durability of some hundreds times as high as that of solid lubricating oil on the magneto-optical recording medium. Therefore, only applying lubricating oil to the flying head was not sufficient for solving the above problem.

SUMMARY OF THE INVENTION

An object of the present invention is to provide a magneto-optical recording device having a flying head that can smoothly float over a magneto-optical recording medium when relative motion occurs between the magneto-optical recording medium and the flying head, and can give stable operation in a long term.

In order to achieve the above object, a magneto-optical recording device relating to the present invention comprises a lubricating member that is mounted on the bottom surfaces of a head slider means and a head coil means which come into contact with a magneto-optical recording medium, or at least on the bottom surface of the head slider means.

With the above configuration, since the flying head for magneto-optical recording smoothly makes contact with the magneto-optical recording medium, scratching and wear occur less on the magneto-optical recording medium and the flying head. As a result, the life of the flying head can be prolonged, thereby permitting the reliability of the magneto-optical recording medium to increase. In addition, in this way, as the magneto-optical recording medium is compatible with magneto-optical recording media produced by other manufactures, a magneto-optical recording device suitable for various purposes can be provided. For the above-mentioned lubricating member, for example, the head slider means may be coated with fluorocarbon resin. In this case, as well, since the magneto-optical recording medium does not make contact with the head slider means directly, the friction between the magneto-optical recording medium and the head slider means can be reduced.

A magneto-optical recording device relating to the present invention may also be configured such that physical protrusions and recessions are formed on the bottom surfaces of the head coil means and the head slider means which come into contact with the magneto-optical recording medium, or at least on the bottom surface of the head slider means. The bottom surface may be coated with a fluorocarbon resin or the like, or physical holes containing liquid lubricant such as fluorocarbon oil may be formed instead of forming physical protrusions and recessions.

With the above configuration, the contact area between the flying head for magneto-optical recording and the magneto-optical recording medium becomes smaller than the case where physical protrusions and recessions or holes are not formed, thereby allowing the friction between them to be reduced. Consequently, scratching and wear occur remarkably less on the magneto-optical recording medium and the flying head.

For a fuller understanding of the nature and advantages of the invention, reference should be made to the ensuring detailed description taken in conjunction with the accompanying drawings.

BRIEF DESCRIPTION OF THE DRAWINGS

FIG. 1 is an explanatory view of the first embodiment of the present invention illustrating a state in which a flying head for magneto-optical recording having a bottom surface to which a solid lubricant is applied floats over a magneto-optical disk.

FIG. 2 is an explanatory view of the third embodiment of the present invention illustrating a state in which a flying head for magneto-optical recording having the bottom surface on which physical protrusions and recessions are formed floats over a magneto-optical disk.

FIG. 3 is an explanatory view of the forth embodiment of the present invention illustrating a state in which a flying head for magneto-optical recording having the bottom surface on which a fluorocarbon resin film is formed floats over a magneto-optical disk.

FIG. 4 is an explanatory view of the fifth embodiment of the present invention illustrating a state in which a flying head for magneto-optical recording having the bottom surface on which physical holes containing liquid lubricant therein are formed floats over a magneto-optical disk.

FIG. 5 is an explanatory view illustrating a state in which a flying head for magneto-optical recording having the bottom surface on which solid lubricant applied physical protrusions and recessions are formed floats over a magneto-optical disk.

FIG. 6 is an explanatory view illustrating a state in which a flying head for magneto-optical recording having the bottom surface provided with a sintered body having physical protrusions and recessions, and holes containing liquid lubricant therein floats over a magneto-optical disk.

FIG. 7 is a perspective view illustrating the schematic configuration of a flying head for magneto-optical recording used in the sixth embodiment of the present invention.

DESCRIPTION OF THE EMBODIMENTS

Embodiment 1

Figure 1:
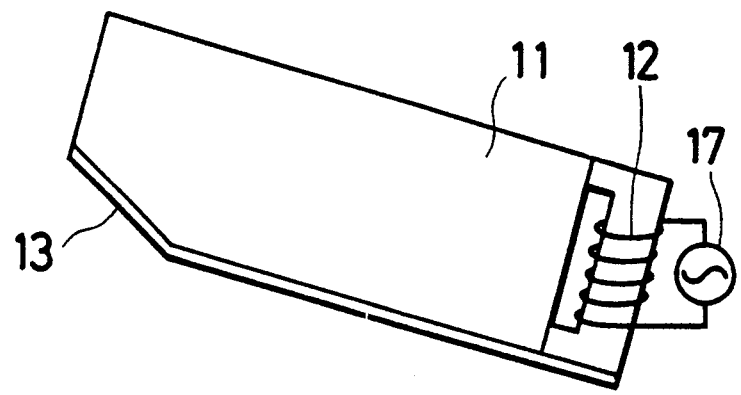
FIG. 1 to FIG. 7 explain the present invention in detail.
Figure 1:
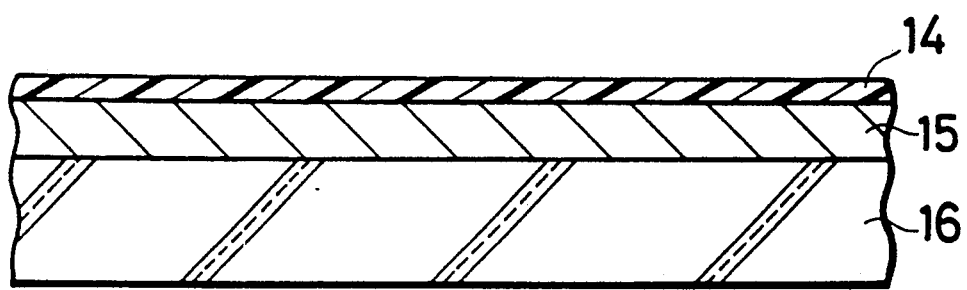

An explanation of the first embodiment of the present invention with reference to FIG. 1 yields the following.

As shown in FIG. 1, a magneto-optical disk as magneto-optical recording medium is composed mainly of a protective resin film 14, a recording film 15 and a substrate 16.

The recording film 15 is formed on the substrate 16, and the protective resin film 14 is on the recording film 15 for the protection. The recording film 15 has multi-layer structure, for example a transparent dielectric film, a rare earth-transition metal alloy thin-film, and a reflecting film (none of them is shown) are laminated. The protective resin film 14 protects the recording layer 15 from scratching, dust, oxidization, etc. Regarding materials for the protective resin film 14, for example an ultraviolet hardening resin that has the advantages of easy handling and saving processing time has been widely used. The protective resin film 14 is formed on the recording film 15 based on the spin coating or other process. More precisely, the ultraviolet hardening resin is first applied to the recording film 15, and then ultraviolet light is irradiated on the ultraviolet hardening resin to harden it and to form the protective resin film 14.

As shown in FIG. 1, a flying head for magnetic recording is composed of a head slider means 11 and a head coil means 12, and the head coil means 12 is formed at an edge of the head slider means The flying head is configured such that the bottom surface of the head coil means 12 is aligned with the bottom surface of the head slider means 11.

The head slider means 11 is made of ferrite or ceramic materials, such as $Al_2O_3$- TiC and $CaTiO_3$. For the coil core of the head coil means 12, MnZn ferrite or other material is used. A power source 17 which generates a magnetic field is connected to the head coil means 12, and the direction of a generated magnetic field varies depending on the polarity of the power source 17. During the rotation of the magneto-optical disk, the head slider means 11 lets the flying head for magneto-optical recording float over the magneto-optical disk.

The flying head having the above configuration comes into contact with a magneto-optical disk when the magneto-optical disk starts and stops rotating. A solid lubricant 13 (lubricating member) is applied to the bottom surfaces of the head slider means 11 and the head coil means 12. For the solid lubricant 13, for example, graphite (C), molybdenum sulfide ($MoS_2$), polytetrafluoroethylene (PTFE), monostearate, triacontyltrimethoxysilane, triacontanol or melamine-cyanurate is solo used or their mixtures are used.

A concrete method of forming the above solid lubricant 13 is described below.

In case of using $MoS_2$, $MoS_2$ particles are dispersed in solvent and the bottom surfaces are then coated with the solvent by the spray coating, and the solvent is volatilized. For this type of spray, there is for example "Rocol dry spray" of SUMICO Corp.

In case of using PTFE, PTFE particles whose diameters are not bigger than 0.2 μm and an organic binder are mixed, and the mixed solution is applied to and fixed on the bottom surfaces by the spray coating. For this type of spray, there is for example "Lubron LA" of Daikin Industries, LTD.

In case of using triacontanol, it is dissolved in a solvent such as isopropyl alcohol and is applied to the bottom surfaces by the dip coating, and the solvent is volatilized.

In case of using graphite, the sputtering process is carried out. Namely, the bottom surfaces is coated with a graphite thin-film based on the sputtering process wherein Ar gas is directed into a vacuum vessel using a carbon target.

When a magneto-optical disk is placed in the magneto-optical recording device comprising the flying head for magneto-optical recording having the configuration described above, a laser beam from light emitting means (not shown) is irradiated on a desired recording portion of the recording film on the magneto-optical disk during the normal rotation of the magneto-optical disk. When the temperature of the desired recording portion rises and reaches or exceeds around the Curie point or its magnetic compensation point, the coercive force on the recording portion becomes zero or substantially zero. At that time, an external magnetic field (bias magnetic field) is applied to the recording portion so as to switch the magnetization direction to a desired direction through the head coil means 12. The magnetization direction can be switched according to the polarity of the power source 17 of the head coil means 12. When the irradiation of the laser beam on the above recording portion is stopped, the temperature of the recording portion drops and eventually returns to the room temperature. Thus, as the magnetization direction of the recording portion which is switched inversely is kept, desired information can be recorded.

As described above, in the present embodiment, since the solid lubricant 13 is applied to the bottom surfaces of the head slider means 11 and the head coil means 12, the head slider means and the head coil means 12 smoothly come into contact with the magneto-optical disk. As a result, scratching and wear occur less on the magneto-optical disk, the head slider means 11 and the head coil means 12, and a floating operation of the head can be carried out smoothly when the magneto-optical disk starts rotating.

In the above embodiment, the solid lubricant 13 is applied to both the head slider means 11 and the head coil means 12, however, it can be applied only to the head slider means 11.

Embodiment 2

For the lubricating member of EMBODIMENT 1 described above, in order to bring about the above-mentioned effect, instead of the solid lubricant 13, for example a fluorocarbon resin film can be formed at least on the bottom surface of a head slider means 11 that comes into contact with a magneto-optical disk. Needless to say, the fluorocarbon resin film can be formed on both the bottom surfaces of the head slider means 11 and a head coil means 12.

A case where the fluorocarbon resin film is formed on both the bottom surfaces of the head slider means 11 and the head coil means 12, is described in detail below. As to members whose functions are the same as the members of EMBODIMENT 1, the same reference numbers are given thereto and the detailed explanations are omitted here. For drawings, as the configuration is the same as FIG. 1, the drawings are left out.

The preferable thickness for a fluorocarbon resin film 13 is 1 μm to 100 μm, and the more preferable thickness is 10 μm to 20 μm. The fluorocarbon resin film 13 is composed, for example, of polytetrafluoroethylene (hereinafter referred to as PTFE). The fluorocarbon resin film 13 is formed as follows: the bottom surfaces of the head slider means 11 and the head coil means 12 are baked at a temperature of 400° C. for not less than two hours or thoroughly degreased by cleaning with trifluoroethylene; the bottom surfaces are then grounded (earth potential), a PTFE powder is negatively charged to be applied to the bottom surfaces (the electrostatic powder coating); and the fluorocarbon resin film 13 is then formed on the bottom surfaces of the head slider means 11 and the head coil means 12 by baking the head whose bottom surface is evenly coated with the PTFE powder at a temperature range of 360° C. to 380° C.

As described above, with the configuration such that the fluorocarbon resin film 13 is formed on the bottom surfaces of the head slider means 11 and the head coil means 12, the head slider means 11 and the head coil means 12 smoothly come into contact with the magneto-optical disk. As a result, scratching and wear occur less on the magneto-optical disk, the head slider means 11 and the head coil means 12, and a floating operation of the head can be carried out smoothly when the magneto-optical disk starts rotating.

Embodiment 3

Figure 2:
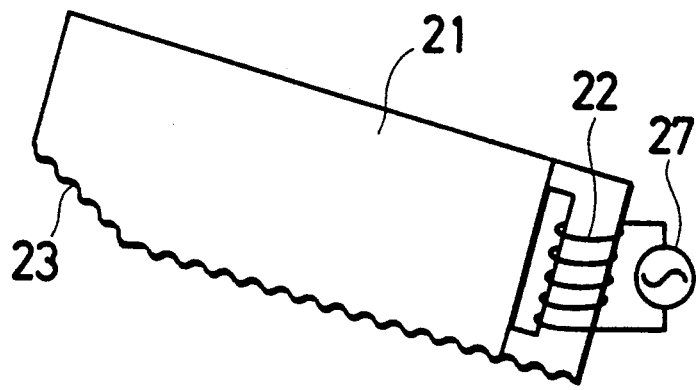
Figure 2:
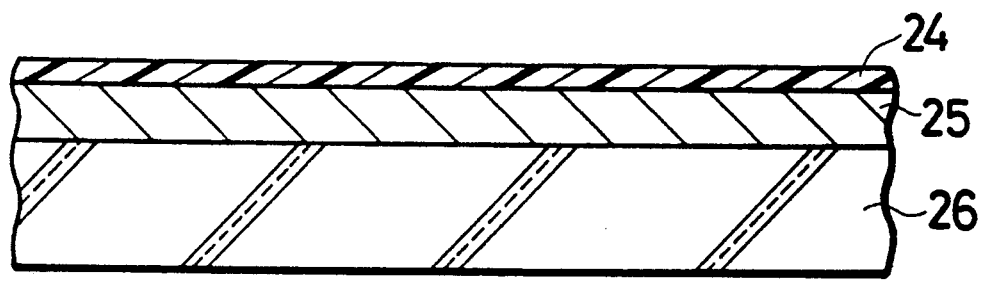

The third embodiment of the present invention with reference to FIG. 2 is described below.

As shown in FIG. 2, a magneto-optical disk as magneto-optical recording medium is composed mainly of a protective resin film 24, a recording film 25 and a substrate 26.

The recording film 25 is formed on the substrate 26 and the protective resin film 24 is on the recording film 25 for the protection. The recording film 25 has multilayer structure, for example a transparent dielectric film, a rare earth-transition metal alloy thin-film, and a reflecting film (none of them is shown) are laminated. The protective resin film 24 protects the recording layer 25 from scratching, dust, oxidization, etc. Regarding materials for the protective resin film 24, for example an ultraviolet hardening resin like EMBODIMENT 1 is used. The protective resin film 24 is formed on the recording film 25 through the spin coating or other process in a similar way to EMBODIMENT 1.

As shown in FIG. 2, a flying head for magnetic recording is composed of a head slider means 21 and a head coil means 22, and the head coil means 22 is formed at an edge of the head slider means 21. The flying head is configured such that the bottom surface of the head coil means 22 is aligned with the bottom surface of the head slider means 21. Like EMBODIMENT 1, the head slider means 21 is made of ferrite or ceramic materials. For the coil core of the head coil means 22, in the same way as EMBODIMENT 1, MnZn ferrite or other material is used. A power source 27 which generates a magnetic field is connected to the head coil means 22, and the direction of a generated magnetic field varies depending on the polarity of the power source 27. During the rotation of the magneto-optical disk, the head slider means 21 lets the flying head for magneto-optical recording float over the magneto-optical disk.

The flying head having the above configuration comes into contact with a magneto-optical disk when the magneto-optical disk starts and stops rotating. On the bottom surfaces of the head slider means 21 and the head coil means 22, physical protrusions and recessions 23 whose maximum height $R_{MAX}$ is 100 nm to 2500 nm are formed.

Table 1 shows the relation between the maximum height $R_{MAX}$ of the physical protrusions and recessions 23 and the coefficient of static friction $\mu_s$ between a magneto-optical disk and the head slider means 21.

When the maximum height $R_{MAX}$ is less than 100 nm, the coefficient of static friction $\mu_s$ rises rapidly, while when the maximum height is not less than 100 nm, the coefficient of static friction $\mu_s$ decreases gradually as the maximum height $R_{MAX}$ increases.

Generally, when the coefficient of static friction $\mu_s$ increases, scratching and wear tend to occur more on the magneto-optical disk, thus the preferable maximum height $R_{MAX}$ is at least 100 nm. On the contrary, if the maximum height $R_{MAX}$ is not less than 2500 nm, floating height becomes too small. Therefore, the preferable maximum height $R_{MAX}$ for the physical protrusions and recessions 23 is 100 nm to 2500 nm.

TABLE 1

| MAXIMUM HEIGHT $R_{MAX}$ | COEFFICIENT OF STATIC FRICTION $\mu_s$ |
|---|---|
| 50 nm | 1.60 |
| 100 nm | 0.43 |
| 2500 nm | 0.37 |

The physical protrusions and recessions 23 are formed in the following way.

First, the bottom surfaces of the head slider means 21 and the head coil means 22 are burnished with a lapping paper with diamond abrasive grains having a fineness of not less than #4000 mesh.

Then the surfaces are burnished with a lapping paper using less finer diamond abrasive grains having a fineness of, for example, not less than #400 to #4000 mesh, so that physical protrusions and recessions 23 of a preferable maximum height $R_{MAX}$ are formed. The physical protrusions and recessions 23 can be formed in any shape.

When a magneto-optical disk is placed in a magneto-optical recording device comprising a flying head of the above configuration, a laser beam from light emitting means (not shown) is irradiated on a desired recording portion of the recording film 25 on the magneto-optical disk. When the temperature of the recording portion reaches or exceeds around the Curie point or its magnetic compensation point, the coercive force on the recording portion becomes zero or substantially zero. At this time, an external magnetic field (bias magnetic field) is applied to the recording portion through the head coil means 22 to switch the magnetization direction into a desired direction. The magnetization direction can be switched according to the polarity of the power source 27 of the head coil means 22. When the irradiation of the laser beam on the recording portion is stopped, the temperature of the recording portion falls and eventually returns to the room temperature. Thus, desired information is recorded by keeping the switched magnetization direction of the recording portion.

As described above, in the present embodiment, the physical protrusions and recessions 23 whose maximum height $R_{MAX}$ is 100 nm to 2500 nm are formed on the bottom surfaces of the head slider means 21 and the head coil means 22. As a result, the contact area between the head slider means - head coil means 22 and the magneto-optical disk becomes smaller, and the friction between them can be reduced. Therefore, scratching and wear occur less on the head slider means 21 and the head coil means 22, and a floating operation of the head can be carried out smoothly at the time the magneto-optical disk starts rotating.

The contact area does not mean an apparent contact area but a true contact area. With a true contact area A and the shear strength of a true contact area $\sigma$, a frictional force F is as follows: $F = \sigma \cdot A$. Therefore, if the shear strength is constant, friction force decreases as the true contact area becomes smaller, i.e., the head slider means 21 and the head coil means 22 smoothly come into contact with the magneto-optical disk.

In the above embodiment, the physical protrusions and recessions 23 are formed on both the head slider means 21 and the head coil means 22, however, they may be formed only on the head slider means 21

Embodiment 4

The fourth embodiment of the present invention with reference to FIG. 3 will be described below.

In order to bring about the above-mentioned effect, instead of the physical protrusions and recessions 23 of EMBODIMENT 3, for example fluorocarbon resin film can be formed at least on the bottom surface of a head slider means 21 that comes into contact with a magneto-optical disk. Needless to say, the above fluorocarbon resin film can be formed on both the bottom surfaces of the head slider means 21 and a head coil means 22.

Figure 3:
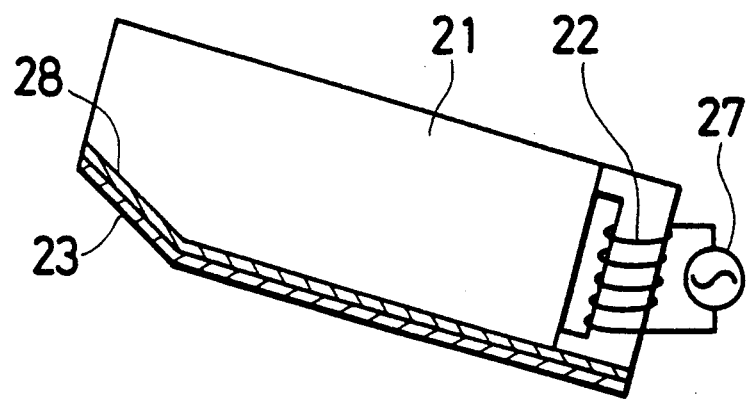
Figure 3:
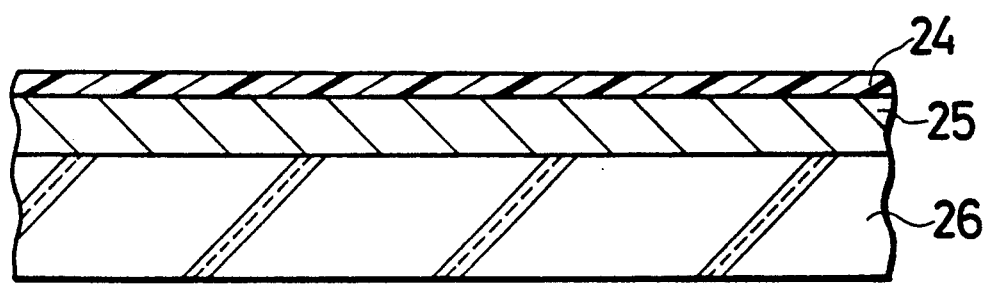

In this embodiment, the fluorocarbon resin film is formed on both the bottom surfaces of the head slider means 21 and the head coil means 22, and the detailed description with reference to FIG. 3 is stated below. As to members whose functions are the same as the members of the above embodiments, the same reference numbers are given thereto and the detailed explanations are omitted here.

The preferable thickness of a fluorocarbon resin film 23 is 1 $\mu$m to 100 $\mu$m, and the more preferable thickness is 10 $\mu$m to 20 $\mu$m. The fluorocarbon resin film 23 is composed, for example, of tetrafluoroethylene-ethylene copolymer. The fluorocarbon resin film 23 is formed as follows: a silane coupling agent 28 is first applied to the bottom surfaces of the head slider means 21 and the head coil means 22 and then the bottom surfaces are coated with the tetrafluoroethylene-ethylene copolymer by the fluidization dip coating; and the head whose bottom surface is evenly coated with the copolymer is then baked at a temperature range of 290° C. to 340° C. to form the fluorocarbon resin film 23 on the bottom surfaces of the head slider means 21 and the head coil means 22. For the formation of fluorocarbon resin film 23, materials are not restricted to the ones used in EMBODIMENT 2 and this embodiment, and for example, powder of tetrafluoroethylenehexafluoropropylene copolymer (FEP), polytrifluorochloroethylene (PTFCE) and polyvinylidene fluoride (PVdF) can be applied to the head and then baked.

With the above configuration such that the fluorocarbon resin film 23 is formed on the bottom surfaces of the head slider means 21 and the head coil means 22, the head slider means 21 and the head coil means 22 come into contact with the magneto-optical disk smoothly. Consequently, scratching and wear occur less on the head slider means 21 and the hard coil means 22, and a floating operation of the head can be carried out smoothly at the time the magneto-optical disk starts rotating.

Table 2 below shows coefficients of static friction ($\mu_s$), measured initial values of coefficients of dynamic friction ($\mu_f$) and values measured after 10000 contact start/stop (CSS) with respect to the respective heads (1) to (3). In the table (1) is the head slider of EMBODIMENT 1, (2) is the head slider of EMBODIMENT 4, and (3) is the ordinal head slider. Additionally, the symbols $\mu_s$ and $\mu_f$ show the coefficients of static friction and the dynamic friction coefficients, respectively, between an ultraviolet hardening resin overcoated magneto-optical disk and the respective sliders of (1) to (3). The values after 10000 CSS was measured after 10000 abrasion tests, in which the head slider means floated over the magneto-optical disk or came into contact with it as the magneto-optical disk started rotating or stopped rotating.

As is clear from FIG. 2, the initial value of the ordinal head slider of (3) is $\mu_s > 1.0$, while the values after 10000 CSS of the head sliders (1) and (2) are still $\mu_s < 1.0$. This means that the floating operations of the head at the time of the magneto-optical disk starts rotating can be carried out smoothly even after 10000 CSS. When the value becomes $\mu_s > 1.0$, abnormalities occur in a suspension for supporting the head slider.

TABLE 2

|     | INITIAL VALUE | | VALUE AFTER 10000 CSS | |
|-----|---------|---------|---------|---------|
|     | $\mu_s$ | $\mu_f$ | $\mu_s$ | $\mu_f$ |
| (1) | 0.35 | 0.26 | 0.36 | 0.25 |
| (2) | 0.38 | 0.28 | 0.43 | 0.30 |
| (3) | 1.60 | 1.25 | — | — |

The values shown in Table 2 were obtained under the following measurement condition: depressing force of the suspension was 5 gf, and the magneto-optical disk rotated at a rotation speed of 2 rpm (rotation per minute) when $\mu_s$ and $\mu_f$ were measured.

Embodiment 5

Figure 5:
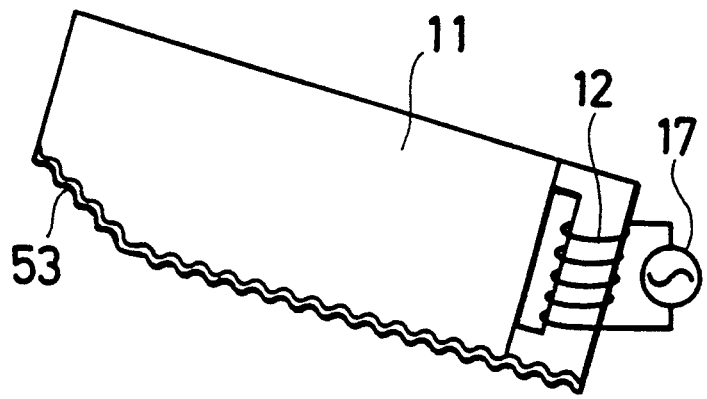
Figure 5:
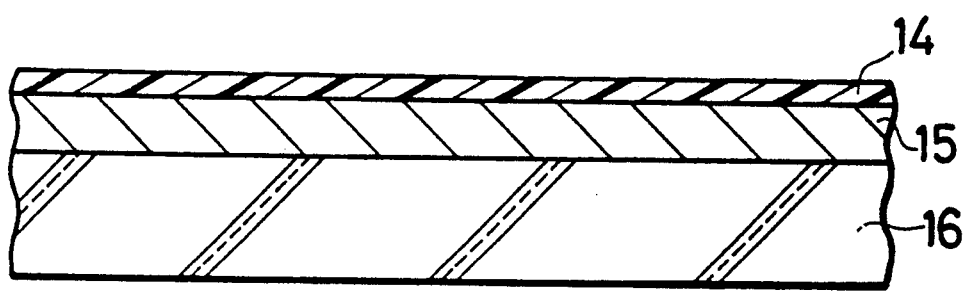

The fifth embodiment of the present invention with reference to FIG. 5 will be described below.

Figure 4:
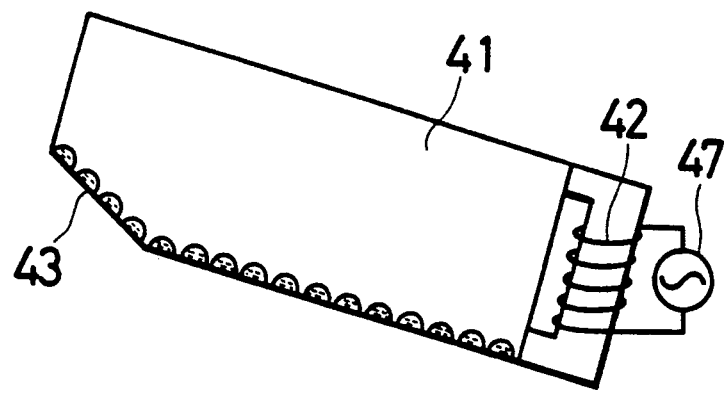
Figure 4:
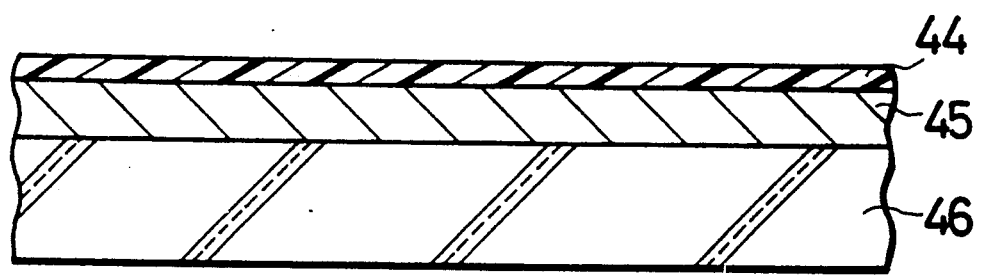

As shown in FIG. 4, a magneto-optical disk as magneto-optical recording medium is composed mainly of a protective resin film 44, a recording film 45 and a substrate 46.

The recording film 45 is formed on the substrate 46, and the protective resin film 44 is on the recording film 45 for the protection. The recording film 45 has multi-layer structure, for example a transparent dielectric film, a rare earth-transition metal alloy thin-film, and a reflecting film (none of them is shown) are laminated. The protective resin film 44 protects the recording layer 45 from scratching, dust, oxidization, etc. Regarding materials (or the protective resin film 44, similar to EMBODIMENT 1, an ultraviolet hardening resin is used. The protective resin film 44 is formed on the recording film 45 through the spin coating or other process in the same manner as EMBODIMENT 1.

As shown in FIG. 4, a flying head for magnetic recording is composed of a head slider means 41 and a head coil means 42, and the head coil is formed at an edge of the head slider means 41. The flying head is configured such that the bottom surface of the head coil means 42 is aligned with the bottom surface of the head slider means 41. The head slider means 41 is made of ceramic materials, such as SiC sintered body and Al$_2$O$_3$-TiC mixed sintered body. For the coil core of the head coil means 42, similar to EMBODIMENT 1, MnZn ferrite or other material is used. A power source 47 which generates a magnetic field is connected to the head coil means 42, and the direction of a generated magnetic field varies depending on the polarity of the power source 47. The head slider means 41 lets the flying head for magneto-optical recording float over the magneto-optical disk.

The flying head of the above configuration comes into contact with the magneto-optical disk when the magneto-optical disk starts and stops rotating. The bottom surface of the head slider means 41 is provided with physical holes 43 having a depth of 10 nm to 2500 nm, and fluorocarbon oil such as perfluoropolyether is contained in the holes.

One example of manufacturing method of the head slider means 41 is described below.

First, SiC fine powder whose diameter is substantially 0.5 $\mu$m and a sintering agent such as B, C, B$_4$C and Al$_2$O$_3$ are mixed and hardened into a predetermined shape by pressing, and then it is heated to 2000° C. to 2200° C. at atmospheric pressure and is sintered. Next, the bottom surface of the head slider means 41 is burnished with diamond grinding stones. The holes 43 having a depth of substantially 250 nm are formed through this process, and the fluorocarbon oil is applied to the bottom surfaces and is contained in the holes 43.

When a magneto-optical disk is placed in a magneto-optical recording device having a flying head of the above configuration, a laser beam from light emitting means (not shown) is irradiated on a desired recording portion of the recording film 45 on the magneto-optical disk. When the temperature of the desired recording portion rises and reaches or exceeds around the Curie point or its magnetic compensation point, the coercive force on the recording portion becomes zero or substantially zero. At that time, an external magnetic field (bias magnetic field) is applied to the recording portion through the head coil means 42 to switch the magnetization direction into a desired direction. The magnetization direction can be switched according to the polarity of the power source 47 of the head coil means 42. When the irradiation of the laser beam on the recording portion is stopped, the temperature of the recording portion drops and eventually returns to the room temperature. Thus, desired information is recorded as the switched magnetization direction of the recording portion is kept.

As described above, in the present embodiment, the holes 43 are formed on the bottom surfaces of the head slider means 41, and the fluorocarbon oil (liquid lubricant) is applied to the bottom surfaces and is contained inside the holes. With the configuration, the fluorocarbon oil contained in the holes 43 oozes out onto the bottom surface of the head slider means 41 when the magneto-optical disk rotates. Since the oozed oil functions as lubricant, it is difficult for the head slider means 41 to come into contact with the magneto-optical disk directly, thereby allowing the friction between the head slider means 41 and the magneto-optical disk to be more reduced than the cases of EMBODIMENT 1 and EMBODIMENT 3. As s result, scratching and wear of the magneto-optical disk, the head slider means 41 and the head coil means 42 extremely decrease. The fluorocarbon oil oozes into the holes 43 again when the magneto-optical disk stops rotating. Consequently, even when a liquid lubricant such as fluorocarbon oil is used, long-time lubricating effects can be expected similar to the case where solid lubricant is used.

When the depth of the holes 43 is not more than 10 nm, it is difficult for a liquid lubricant such as fluorocarbon oil to ooze into the holes, while when the depth is not less than 2500 nm, it is difficult for the liquid lubricant to ooze out onto the surface. Therefore, the preferable depth for the holes 43 is 10 nm to 2500 nm.

In this embodiment, a case where the physical holes 43 are formed only on the head slider means 41 and the fluorocarbon oil is contained in the holes 43, is explained, however, the holes 43 containing the fluorocarbon oil can be formed on both the head slider means 41 and the head coil means 42. In addition, oil such as fluorosilicon oil, silicon oil, and olefin oil can be used instead of fluorocarbon oil to obtain the above effects.

Figure 6:
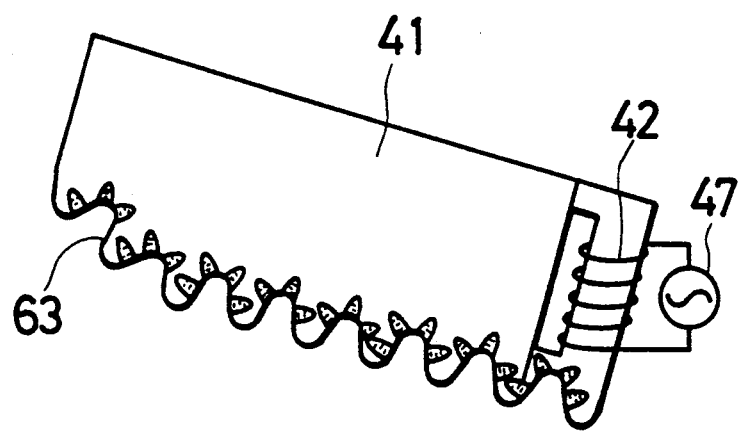
Figure 6:
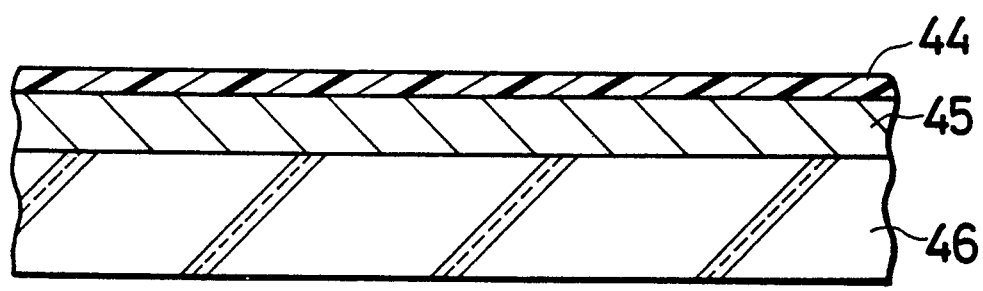

In the above embodiments, a flying head to which solid lubricant is applied (FIG. 1), a flying head whereon physical protrusions and recessions 23 are formed (FIG. 2), a flying head whereon a fluorocarbon resin film is formed (FIG. 3) and a flying head whose bottom surface is provided with holes to which liquid lubricant is applied and the liquid lubricant is contained in the holes (FIG. 4) were described. In order to obtain a better lubricity due to the synergistic effect, the following two heads can be employed: a flying head having a bottom surface 53 on which physical protrusions and recessions are formed and solid lubricant is applied thereto (FIG. 5); and a flying head having a bottom surface 63 provided with physical protrusions and recessions on the above-mentioned sintered body comprising holes, liquid lubricant that is contained in the holes (FIG. 6). Regarding members of FIG. 5 and FIG. 6 which have the same functions as the members of FIG. 1 and FIG. 4, for convenience' sake, the same reference numbers are given to them and the detailed explanations are omitted here.

Embodiment 6

The sixth embodiment of the present invention with reference to FIG. 7 will be explained below.

Figure 7:
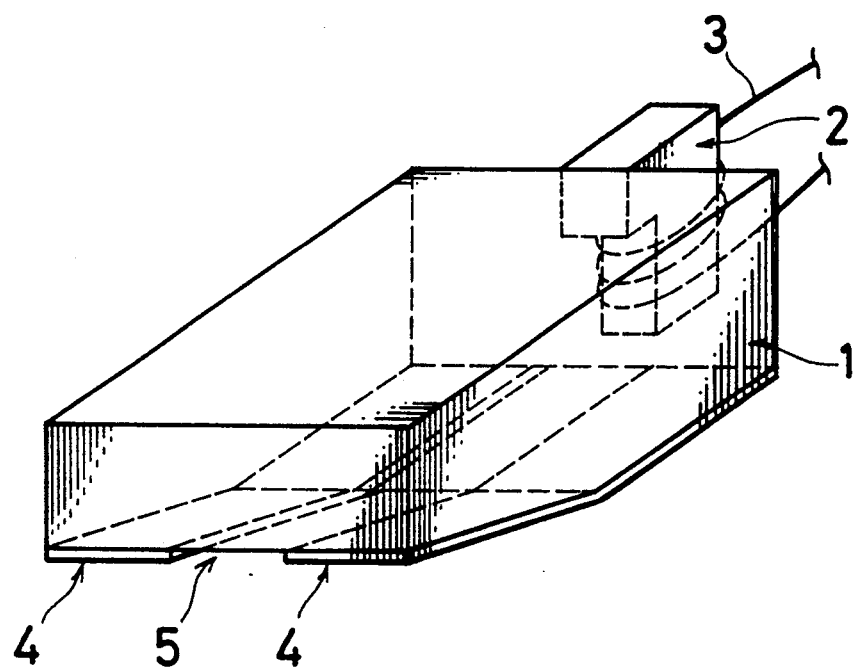
Figure 8:
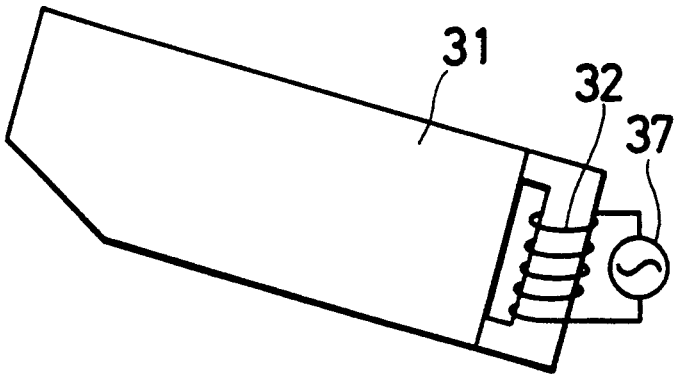
FIG. 8 is an explanatory view of a conventional example illustrating a state in which a flying head for magneto-optical recording floats over a magneto-optical disk having lubricating oil on the surface thereof.
Figure 8:
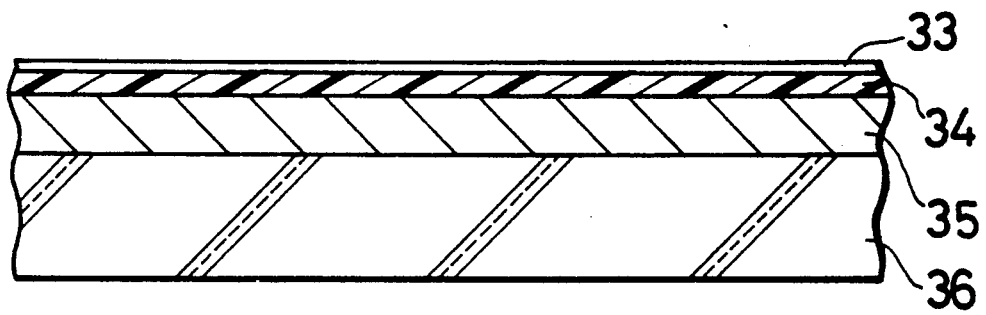

FIG. 7 is a perspective view illustrating the schematic configuration of a flying head for magneto-optical recording employed in a magneto-optical recording device of this embodiment.

The flying head of the present invention is composed mainly of a head slider means 1 receiving a floating force and a head coil means 2 around which a lead wire 3 is wound. Thin-film layers 4 made, for example, of a fluorocarbon resin film of a thickness of 5 $\mu$m are symmetrically formed on the both right and left sides of the bottom surface of the head slider means 1 with respect to the rotating direction of a magneto-optical disk. Consequently, a gutter 5 whose depth equals the thickness of the thin-film layer 4 is formed in the middle of the bottom surface where the thin-film layer 4 is not formed. The gutter 5 of shallow depth can be made easily on the bottom surface of the head slider means 1 by reducing the thickness of the thin-film layer 4.

An example of the procedure for forming the thin-film layer 4 is as follows. First, an area of the bottom surface of the head slider means 1 which is expected to be the gutter 5 is masked, and liquid fluorocarbon resin is applied to the entire bottom surface by the spray coating or the dip coating, and then the liquid fluorocarbon resin is hardened by irradiating ultraviolet light, heating, drying or other method. Material for forming the thin-film layer 4 is not restricted to fluorocarbon resin, any resin which has an excellent lubricity can be used. If the coefficient of the static friction between a resin and a magneto-optical disk surface is 1 or less, it is judged that the resin has good lubricity. Even resin whose lubricity is not so good can be used by applying lubricant such as perfluoropolyether to the formed thin-film layer 4 so as to improve its lubricity.

Additionally, $SiO_2$ or inorganic materials such as carbon may be used for a thin-film layer 4. In case of forming the thin-film layer of $SiO_2$, masking is performed in the above-described manner, and then alcohol solution of tetrahydroxysilane is applied to the entire bottom surface, dried and baked.

In case of forming a thin-film layer 4 of carbon, after masking, a carbon film is formed through the sputtering process, the evaporation process, the CVD (Chemical Vapour Deposition) process or other process. In case of using these inorganic materials, it is preferable to apply lubricant to the thin-film layer 4 in order to improve its lubricity.

In a magneto-optical disk device comprising the above-mentioned flying head for magneto-optical recording, when a magneto-optical disk rotates at a high speed, the flying head for magneto-optical recording floats over the magneto-optical disk due to a floating force exerted upward on the head by air flowing between the head slider means I and the magneto-optical disk. When the floating height reaches substantially 5 μm, the floating force is balanced with the depressing force exerted downward on the head by a suspension (not shown) for supporting the head slider means 1. At this time, the floating force is distributed into two, right side and left side by the gutter 5, thereby permitting to obtain a stable floating condition.

During recording information, a laser beam of a fixed light amount is irradiated on the magneto-optical disk and rises the temperature of a magnetic film to reach or exceed around the Curie point or its magnetic compensation point to make the coercive force of the recording portion whereto the laser beam is applied zero or substantially zero, and then a magnetic field setting current that is switched at a high speed according to recording signals is applied to the lead wire 3 of the head coil means 2, so that high-speed switched magnetic field can be applied effectively to the recording portion and data can thus be recorded at a high speed by overwriting.

In EMBODIMENT 1 to EMBODIMENT 6 described above, a flying head for magneto-optical recording which is mounted on a magneto-optical recording device is explained, however, the present invention can be adopted for the flying heads employed in other magneto-optical recording devices or other devices in which compatible disks are used.

As aforesaid, a magneto-optical recording device relating to the present invention is configured such that a lubricating member is formed on the bottom surfaces of a head coil means and a head slider means, which make contact with a magneto-optical recording medium, or at least on the bottom surface of the head slider means. According to the configuration, a flying head for magneto-optical recording smoothly comes into contact with the magneto-optical recording medium, so that the scratching and wear of the magneto-optical recording medium and the flying head for magneto-optical recording decrease. As a result, the life of the flying head for magneto-optical recording can be prolonged, causing the reliability of the magneto-optical recording device to increase. In addition, the present invention is compatible with magneto-optical recording media produced by other manufactures, so that a magneto-optical recording device suitable for various purposes can be offered.

Moreover, a magneto-optical recording device comprising a flying head for magneto-optical recording of the present invention may be configured such that physical protrusions and recessions or holes containing liquid lubricant therein are formed on the bottom surfaces of the head coil means and the head slider means of the flying head which come into contact with a magneto-optical recording medium, or at least on the bottom surface of the head slider means. In this case, as well, since the contact area between the flying head for magneto-optical recording and the magneto-optical recording medium becomes smaller than the case where the physical protrusions and recessions or holes are not formed, the friction between them can be diminished. As a result, the scratching and wear of the magneto-optical recording medium and the flying head can be further reduced.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A magneto-optical recording device comprising a flying head for magneto-optical recording which floats over a magneto-optical recording medium according to the rotation of the magneto-optical recording medium, the flying head having:

a head slider means for making the head float over the magneto-optical recording medium, the head slider means having a first bottom surface which comes into contact with the magneto-optical recording medium; and a head coil means for generating an external magnetic field for recording information on the magneto-optical recording medium, the head coil means having a second bottom surface which comes into contact with the magneto-optical recording medium, wherein said first bottom surface comprises physical holes having a depth of between 10 nm to 2500 nm and containing a liquid lubricant therein.

2. A magneto-optical recording device comprising a flying head for magneto-optical recording which floats over a magneto-optical recording medium according to the rotation of the magneto-optical recording medium, the flying head having:

a head slider means for making the head float over the magneto-optical recording medium, the head slider means having a first bottom surface which comes into contact with the magneto-optical recording medium; and a head coil means for generating an external magnetic field for recording information on the magneto-optical recording medium, the head coil means having a second bottom surface which comes into contact with the magneto-optical recording medium, wherein said first bottom surface comprises physical protrusions and recessions the maximum height of these physical protrusions and recessions being in the range of 100 nm to 2500 nm, and these physical protrusion and recessions including holes having a depth of 10 nm to 2500 n, the holes containing a liquid lubricant therein.

3. A magneto-optical recording device as defined in claim 1 or claim 2, wherein the liquid lubricant is fluorocarbon oil, fluorosilicon oil, silicon oi¹ or olefin oil.

4. A magneto-optical recording device comprising a flying head for magneto-optical recording which floats over a magneto-optical recording medium according to the rotation of the magneto-optical recording medium, the flying head having:

head slider means for making the head float over the magneto-optical recording medium, the head slider means having a first bottom surface which comes into contact with the magneto-optical recording medium; and a head coil means for generating an external magnetic field for recording information on the magneto-optical recording medium, the head coil means having a second bottom surface which comes into contact with the magneto-optical recording medium, wherein said first bottom surface has right and left sides along the rotating direction of the magneto-optical recording medium and said right and left sides each comprising a laminated thin-film layer made of fluorocarbon resin, $SiO_2$ or carbon.

* * * * *